US 10,990,415 B2

(12) United States Patent
He

(10) Patent No.: US 10,990,415 B2
(45) Date of Patent: Apr. 27, 2021

(54) DISK MANAGEMENT METHOD AND APPARATUS IN ARM DEVICE AND ARM DEVICE

(71) Applicant: Huawei Technologies Co., Ltd., Shenzhen (CN)

(72) Inventor: Lei He, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 117 days.

(21) Appl. No.: 16/362,184

(22) Filed: Mar. 22, 2019

(65) Prior Publication Data

US 2019/0220291 A1 Jul. 18, 2019

Related U.S. Application Data

(63) Continuation of application No. PCT/CN2017/092814, filed on Jul. 13, 2017.

(30) Foreign Application Priority Data

Oct. 27, 2016 (CN) .......................... 201610970781.6

(51) Int. Cl.
G06F 1/24 (2006.01)
G06F 9/445 (2018.01)
(Continued)

(52) U.S. Cl.
CPC ............ *G06F 9/44505* (2013.01); *G06F 3/06* (2013.01); *G06F 3/0604* (2013.01);
(Continued)

(58) Field of Classification Search
CPC ...... G06F 9/44505; G06F 9/4408; G06F 3/06; G06F 9/4401; G06F 3/0604;
(Continued)

(56) References Cited

U.S. PATENT DOCUMENTS 5,802,365 A * 9/1998 Kathail ................. G06F 9/4411
710/10
2002/0069317 A1* 6/2002 Chow .................... G06F 3/067
711/104
(Continued)

FOREIGN PATENT DOCUMENTS

CN 101499008 A 8/2009
CN 101819508 A 9/2010
(Continued)

OTHER PUBLICATIONS

Machine Translation and Abstract of Chinese Publication No. CN101819508, Sep. 1, 2010, 3 pages.
(Continued)

Primary Examiner — Volvick Derose
(74) Attorney, Agent, or Firm — Conley Rose, P.C.

(57) ABSTRACT

A disk management method and apparatus in an advanced reduced instruction set computing (RISC) Machine (ARM) device and an ARM device, where the method includes receiving, by the ARM device, configuration information, where the configuration information includes a mapping data between a startup sequence of each of a plurality of disks and a respective slot number, creating a device tree block (DTB) file including the configuration information, and starting each of the disks in a sequence based on the DTB file. Hence, problems of inflexible configuration and poor versatility in disk management method in an ARM device are resolved.

20 Claims, 3 Drawing Sheets

(51) Int. Cl.
*G06F 9/4401* (2018.01)
*G06F 3/06* (2006.01)
*G06F 8/41* (2018.01)

(52) U.S. Cl.
CPC .......... *G06F 3/0659* (2013.01); *G06F 3/0683* (2013.01); *G06F 8/41* (2013.01); *G06F 9/4401* (2013.01); *G06F 9/4408* (2013.01); *G06F 9/4411* (2013.01)

(58) Field of Classification Search
CPC ........ G06F 3/0683; G06F 3/0659; G06F 8/41; G06F 3/0632; G06F 3/0607; G06F 3/0689; G06F 3/0676; G06F 3/0629
USPC .......................................................... 713/100
See application file for complete search history.

(56) References Cited

U.S. PATENT DOCUMENTS

| | | | | |
|---|---|---|---|---|
| 2003/0226004 | A1* | 12/2003 | Abbondanzio | G06F 9/4405 713/1 |
| 2004/0073747 | A1* | 4/2004 | Lu | G06F 3/0605 711/114 |
| 2006/0123189 | A1* | 6/2006 | Bitner | G06F 3/0604 711/111 |
| 2009/0049291 | A1* | 2/2009 | Benhase | G06F 3/065 713/2 |
| 2010/0095060 | A1* | 4/2010 | Strange | G06F 3/0647 711/114 |
| 2010/0277825 | A1* | 11/2010 | Chien | G06F 3/0632 360/71 |
| 2011/0087873 | A1* | 4/2011 | Nukada | G06F 11/1469 713/2 |
| 2012/0011505 | A1* | 1/2012 | Fujisaki | G06F 9/45558 718/1 |
| 2013/0097377 | A1* | 4/2013 | Satoyama | G06F 3/065 711/114 |
| 2013/0124932 | A1* | 5/2013 | Schuh | G11C 29/16 714/718 |
| 2014/0019685 | A1* | 1/2014 | Ling | G06F 3/0664 711/114 |
| 2014/0047180 | A1* | 2/2014 | Ling | G06F 3/0632 711/114 |
| 2016/0139834 | A1* | 5/2016 | Hanson | G06F 3/0689 711/114 |
| 2017/0054593 | A1* | 2/2017 | Borikar | H04L 41/0816 |
| 2018/0034904 | A1* | 2/2018 | Roy | G06F 11/2033 |

FOREIGN PATENT DOCUMENTS

| | | |
|---|---|---|
| CN | 104461402 A | 3/2015 |
| CN | 104932922 A | 9/2015 |
| CN | 105607911 A | 5/2016 |

OTHER PUBLICATIONS

Machine Translation and Abstract of Chinese Publication No. CN104461402, Mar. 25, 2015, 9 pages.
Machine Translation and Abstract of Chinese Publication No. CN104932922, Sep. 23, 2015, 15 pages.
Machine Translation and Abstract of Chinese Publication No. CN105607911, May 25, 2016, 6 pages.
Foreign Communication From a Counterpart Application, PCT Application No. PCT/CN2017/092814, English Translation of International Search Report dated Oct. 17, 2017, 2 pages.
Machine Translation and Abstract of Chinese Publication No. CN101499008, Aug. 5, 2009, 14 pages.
Foreign Communication From a Counterpart Application, Chinese Application No. 201610970781.6, Chinese Office Action dated Mar. 18, 2019, 5 pages.

* cited by examiner

DISK MANAGEMENT METHOD AND APPARATUS IN ARM DEVICE AND ARM DEVICE

CROSS-REFERENCE TO RELATED APPLICATIONS

This application is a continuation of International Patent Application No. PCT/CN2017/092814 filed on Jul. 13, 2017, which claims priority to Chinese Patent Application No. 201610970781.6 filed on Oct. 27, 2016. The disclosures of the aforementioned applications are hereby incorporated by reference in their entireties.

TECHNICAL FIELD

The present application relates to the communications field, and in particular, to a disk management method and apparatus in an advanced reduced instruction set computing (RISC) machine (ARM) device and an ARM device.

BACKGROUND

An ARM) processor is a processor featuring small size, low power consumption, low costs, and high performance. The ARM processor supports two instruction sets Thumb (16-bit) and ARM (32-bit), is well compatible with 8-bit and 16-bit devices, and has a flexible and simple addressing manner and another advantage, and therefore an ARM device in which an ARM processor is configured is more widely used.

The ARM processor integrates functions of a serial attached Small Computer System Interface (SCSI) (SAS) controller. The SAS controller is configured to manage disks using the SAS protocol. To simplify a design of the SAS controller and control costs, the SAS controller does not have functions provided by firmware of a redundant array of independent disks (RAID) card in a conventional X-86 server. That is, the SAS controller cannot save a startup sequence of the disks. Consequently, in a power-on or restart scenario of the ARM device, the startup sequence of the disks cannot be controlled, leading to a series of read and write errors caused by a drive letter change.

In other approaches, a startup sequence of disks is ensured using a manner of starting all the disks according to a fixed sequence. However, on different ARM devices using ARM chips of a same model, different quantities of disks and startup sequences are presented. Different types of SAS drives need to be developed for different hardware forms, and each type of SAS drive needs to be specific to a reporting sequence and a quantity of disks of an ARM device, resulting in inflexible configuration and poor versatility. Therefore, the other approaches disk management manner in an ARM device has problems of inflexible configuration and poor versatility.

SUMMARY

Embodiments of the present application provide a disk management method and apparatus in an ARM device and an ARM device such that a device tree source (DTS) file can be used to record a SAS controller, a hardware interface, and a correspondence between slot numbers and a startup sequence that are associated with each disk, and the ARM device can start disks according to a user-configured startup sequence of the disks. This resolves problems of inflexible configuration and poor versatility.

According to a first aspect, a disk management method in an ARM device is provided. In this method, the ARM device receives configuration information including a correspondence between slot numbers and a startup sequence of disks, first updates a preconfigured device source DTS file based on the configuration information, where the DTS file before the update includes a SAS controller, a hardware interface, and a slot number that are associated with each disk, and an updated DTS file includes the SAS controller, the hardware interface, and a correspondence between slot numbers and a startup sequence that are associated with each disk, and then converts the updated DTS file to a device tree block (DTB) file, and finally, the ARM device may scan the disks based on the SAS controller, the hardware interface, and the correspondence between slot numbers and a startup sequence that are associated with each disk and that are in the DTB file, and start the disks in order to resolve problems of inflexible configuration and poor versatility in the other approaches in which disks are started according to a fixed sequence to ensure the startup sequence of the disks.

In a possible implementation, that the ARM device scans the disks based on the SAS controller, the hardware interface, and the correspondence between slot numbers and a startup sequence that are associated with each disk and that are in the DTB file, and starts the disks includes booting an operating system based on the DTB file such that the operating system automatically loads a SAS drive after being started, and the SAS drive scans the disks based on the SAS controller, the hardware interface, and the correspondence between slot numbers and a startup sequence that are associated with each disk and that are in the DTB file, and starts the disks one by one.

In another possible implementation, that the ARM device receives configuration information includes starting, by the ARM device, a Basic Input/Output System (BIOS) self-test after performing a power-on operation, where the BIOS self-test includes detecting hardware, a network interface, a keyboard, and a serial port of the ARM device, and determining, based on a choice of a user, to display a screen for configuring a startup sequence of disks.

In another possible implementation, a method for converting the DTS file to the DTB file by the ARM device includes converting the DTS file to the DTB file using a device tree compiler (DTC).

According to the description in the foregoing content, the ARM device updates the preconfigured DTS file based on the configuration information, and converts the updated DTS file to the DTB file that can be recognized by the ARM device, and after the operating system is started and loads the SAS drive, the SAS drive can start the disks according to the startup sequence of the disks in the DTB file in order to resolve the problems of inflexible configuration and poor versatility in the other approaches disk management method in an ARM device. In addition, in this embodiment of the present application, the SAS drive can determine the startup sequence of the disks simply by reading the DTB file, or only one type of SAS drive is required to implement disk management for different ARM devices using ARM chips of a same model. This reduces costs and improves ARM device disk management efficiency.

According to a second aspect, a disk management apparatus in an ARM device is provided, where the apparatus includes modules configured to execute the disk management method in the first aspect or any possible implementation of the first aspect.

According to a third aspect, an ARM device is provided, where the ARM device includes a processor, a memory, a communications interface, and a bus, the processor, the memory, and the communications interface are connected and communicate with each other using the bus, the memory is configured to store a computer executable instruction, and when the ARM device runs, the processor executes the computer executable instruction in the memory, to execute disk management method in an ARM device in the first aspect or any possible implementation of the first aspect using hardware resources of the ARM device.

According to a fourth aspect, a computer readable medium is provided configured to store a computer program, where the computer program includes an instruction used to execute the method in the first aspect or any possible implementation of the first aspect.

In conclusion, the DTS is used to record the SAS controller, the hardware interface, and the correspondence between slot numbers and a startup sequence that are associated with each disk, and the file is allowed to be updated based on the configuration information, after the SAS drive in the ARM device is started, the disks may be started according to the configured startup sequence, and then an operating system allocates drive letters according to the startup sequence of the disks in order to resolve the problems such as inflexible configuration and poor versatility in the other approaches disk management method in an ARM device. In addition, in the other approaches, when ARM chips of a same model are connected to different devices, different SAS drives need to be customized based on quantities, types, and startup sequences of disks of the ARM devices. By contrast, in the present application, the SAS drive determines the startup sequence of the disks according to the DTB file, or only one type of SAS drive is required to implement disk management for different ARM devices using ARM chips of a same model, achieving high versatility and low costs.

Based on the implementations provided in the foregoing aspects, this application may further provide more implementations by performing further combinations.

BRIEF DESCRIPTION OF DRAWINGS

To describe the technical solutions in some of the embodiments of the present application more clearly, the following briefly describes the accompanying drawings describing some of the embodiments of the present application. The accompanying drawings in the following description show merely some embodiments of the present application, and a person of ordinary skill in the art may derive other drawings from these accompanying drawings without creative efforts.

DESCRIPTION OF EMBODIMENTS

In the other approaches, after an ARM device performs a power-on operation, the ARM device automatically runs a program stored in a BIOS, where the program records hardware, such as hard disks, a network interface, a keyboard, a serial port, and a parallel port, directly connected to a Peripheral Component Interconnect Express (PCIe) mainboard. Then, the ARM device reads initial master boot record (MBR) information from the BIOS, and loads a boot loader from a specific partition of the device based on the MBR information. The boot loader stores related information of an operating system (also referred to as OS), such as an operating system name and a location in which an operating system kernel is located. The operating system kernel is used to manage hardware resources of a computer and acts as an interface between software and hardware. Any operation on the operating system needs to be conveyed to the hardware using the kernel. Then, the ARM device loads the operating system, or loads the operating system kernel. The operating system automatically loads a SAS drive. The SAS drive scans disks based on a binary DTB file obtained by compiling a default DTS file stored in the BIOS and starts the disks, and at the same time sends information about the started disks to the operating system such that the operating system allocates a drive letter for each disk. The default DTB file stored in the BIOS records only a SAS controller identifier and identification information of a physical interface managed by a SAS controller. A sequence of mounting the disks is related to a sequence of scanning and starting the disks. In addition, the ARM device does not have functions provided by firmware of a Raid card in a conventional X-86 system, that is, the SAS controller cannot store a reporting sequence of the disks. Consequently, in a power-on or restart scenario of the ARM device, the reporting sequence of the disks cannot be controlled, leading to a series of read and write errors caused by a drive letter change.

The following clearly describes the technical solutions in the embodiments of the present application with reference to the accompanying drawings in the embodiments of the present application. The described embodiments are a part rather than all of the embodiments of the present application. All other embodiments obtained by a person of ordinary skill in the art based on the embodiments of the present application without creative efforts shall fall within the protection scope of the present application.

Figure 1:
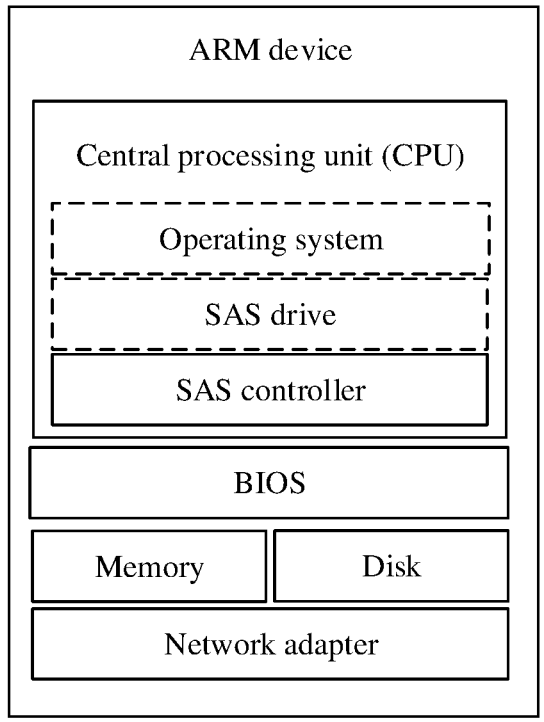
FIG. 1 is a logical system block diagram of an ARM device according to an embodiment of the present application.

FIG. 1 is a system block diagram of an ARM device. As shown in the figure, the ARM device is a device using a reduced instruction set processor provided by Acorn Computers, mainly including a central processing unit (CPU), a memory, at least two disks, a BIOS, and a network adapter. On the CPU, an operating system, a SAS drive, and a SAS controller are running. The operating system and the SAS drive are software running on the CPU, and the SAS controller is hardware that implements transmission based on the SAS protocol using fixed pins of the CPU.

The SAS drive is configured to, in a startup process of the operating system, scan disks based on a DTB file and start the scanned disks, and at the same time report the started disks to the operating system such that the operating system allocates drive letters according a disk reporting sequence. The SAS controller is configured to manage the disks of the ARM device using the SAS protocol. The ARM device may include at least one SAS controller, and each SAS controller has one or more hardware interfaces for disk control. For example, the hardware interface may be a physical layer (PHY). Each hardware interface is in a one-to-one correspondence with a disk, and further, each PHY corresponds to one disk slot number. In the other approaches, based on configurations of different vendors, each SAS controller may manage four to eight disks.

The BIOS is fixedly stored on a dedicated flash memory (FLASH) as a BIOS, and is configured to store the most important basic input/output program of a computer, a power on self-test (POST) program, and a system self-running program. A main function of the BIOS is to provide bottom-layer and most direct hardware configuration and control.

It should be noted that a status of a disk in the ARM device may be running or not running. That the SAS drive starts a disk means performing a power-on operation on the disk and updating the status of the disk to running such that the disk can support normal read and write operations.

It should be further noted that the ARM device shown in FIG. 1 may be a server whose CPU is an ARM processor, or may be a device such as a portable device whose CPU is an ARM processor or a terminal using a SAS controller. In addition, a LINUX operating system such as a SUSE or a Redhat operating system, or a WINDOWS operating system such as WINDOWS 8 may be installed on the ARM device in the present application. This is not limited in the present application. In the following embodiments of the present application, detailed descriptions are provided using an ARM device on which the Linux operating system is installed as an example.

Figure 2:
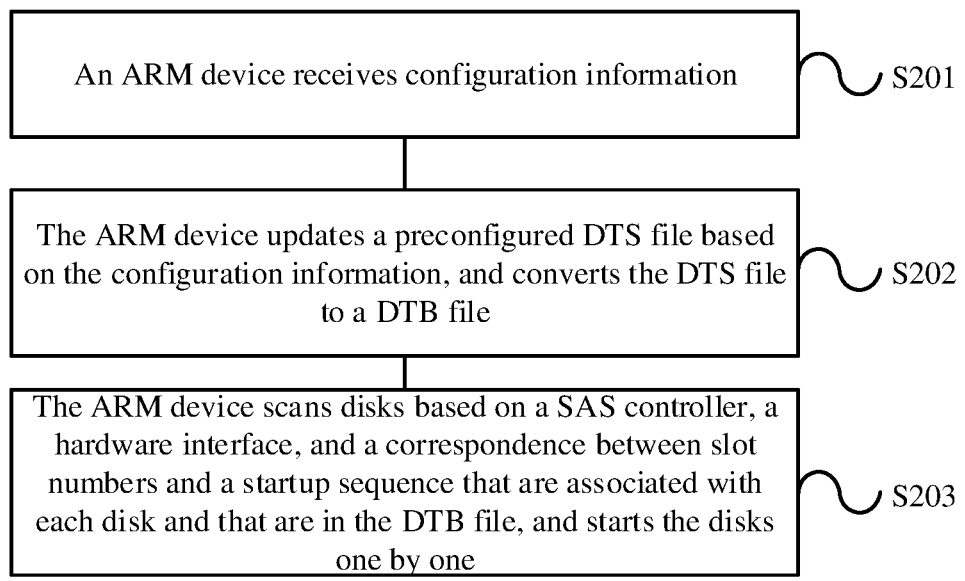
FIG. 2 is a schematic flowchart of a disk management method in an ARM device according to an embodiment of the present application.

FIG. 2 is a schematic flowchart of a method for controlling a startup sequence of disks according to the present application when a SAS controller is integrated into an ARM device without adding a RAID controller. As shown in the figure, the method includes the following steps.

Step S201. The ARM device receives configuration information.

Further, a BIOS in the ARM device receives the configuration information. The configuration information includes a correspondence between disk slot numbers and a startup sequence.

Step S202. The ARM device updates a preconfigured DTS file based on the configuration information, and converts the DTS file to a DTB file.

Further, there is the preconfigured DTS file and the DTB file in the BIOS of the ARM device. The DTS file before the update includes a SAS controller, a hardware interface, and a slot number that are associated with each disk, and an updated DTS file includes the SAS controller, the hardware interface, and a correspondence between slot numbers and a startup sequence that are associated with each disk. For ARM processors of a same model, DTS files and DTB files may be preconfigured when the ARM processors are connected to different ARM devices. The DTS file is a text file used to record the configuration information of a user, and is a user readable file. However, the ARM device cannot directly recognize content recorded in the file, but instead needs to compile the DTS file using a DTC, to convert the DTS file to a binary DTB file for the ARM device to read and process, that is, to convert the preconfigured DTS file to the preconfigured DTB file. When the ARM device is performing the power-on operation, if the user chooses to configure the startup sequence of the disks, the BIOS displays a configuration interface. The user may configure the startup sequence of the disks on the configuration interface, and the ARM device may record the configuration information of the user using the DTS file.

Optionally, the DTS file before the update may further include the startup sequence of all disks. That is, the preconfigured DTS file further includes the SAS controller, the hardware interface, and the correspondence between slot numbers and a startup sequence that are associated with each disk. If the configuration information is not received, the ARM device may start the disks according to the preconfigured startup sequence.

Step S203. The ARM device scans disks based on a SAS controller, a hardware interface, and a correspondence between slot numbers and a startup sequence that are associated with each disk and that are in the DTB file, and starts the disks one by one.

Further, the ARM device provides the DTB file and a kernel image to boot an operating system. The kernel image is an operating system kernel in a form of a file, and is stored in a storage device of the ARM device and used to boot the operating system. After being started, the operating system automatically loads a SAS drive. The SAS drive reads information in the DTB file to obtain the user-configured startup sequence of the disks, scans the disks one by one according to the startup sequence and starts the disks, and reports the started disks to the operating system. The operating system allocates drive letters according to a reporting sequence to ensure that each disk is started and allocated a drive letter according to the specified sequence.

It can be learned from the description from step S201 to step S203 that the ARM device records SAS controllers, hardware interfaces, and the correspondence between slot numbers and a startup sequence using the DTS file, and converts the DTS to the DTB file such that the ARM device can start the disks and allocate the drive letters according to the startup sequence of the disks recorded in the DTB file. Compared with the other approaches in which disks are started according to a fixed sequence, the present application resolves a problem of inflexible configuration in an ARM device disk management manner caused by the specified reporting sequence. In addition, in the present application, the startup sequence of the disks are configured and recorded using the DTS file, after the ARM device successfully boots the operating system, the operating system automatically loads the SAS drive, and the SAS drive reads the startup sequence of the disks in the DTB file and reports the startup sequence of the disks to the operating system, and the operating system implements a drive letter allocation process according to the reporting sequence. For different ARM devices in which ARM processors of a same model are configured, the SAS drive can determine a startup sequence of disks based on updated DTS and DTB files, without configuring different SAS drivers for different startup sequences. That is, only one set of SAS drive is required to achieve an objective of controlling the startup sequence of the disks, resolving a problem of poor versatility caused by that different SAS drives need to be for different ARM devices.

Figure 3:
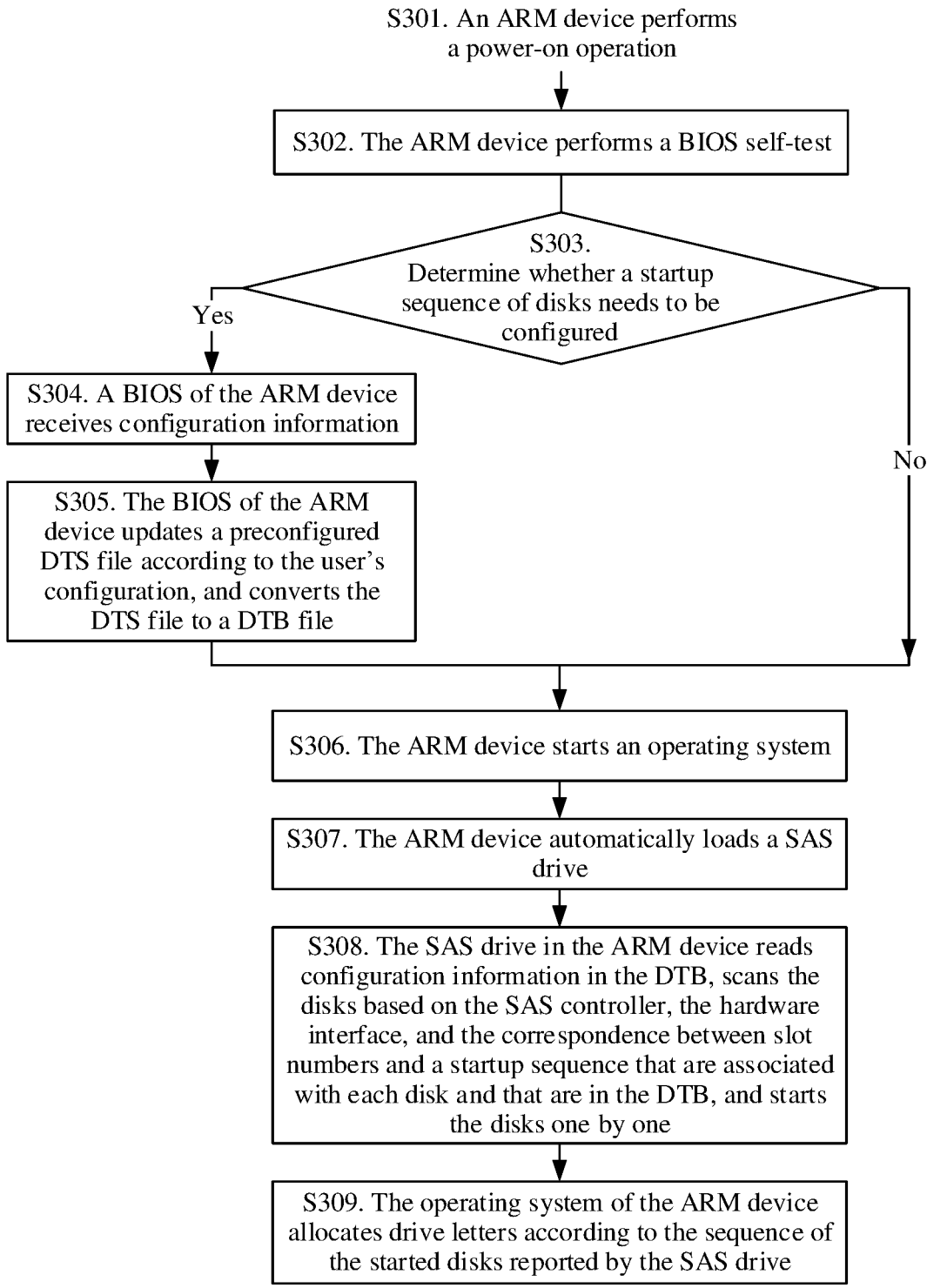
FIG. 3 is a schematic flowchart of another disk management method in an ARM device according to an embodiment of the present application.

The following describes in detail a disk management method in an ARM device according to the present application with reference to FIG. 3. As shown in the figure, the method includes the following steps.

Step S301. The ARM device performs a power-on operation.

Step S302. The ARM device performs a BIOS self-test operation.

Further, after the ARM device performs the power-on operation, a BIOS performs a POST to detect programs stored in key system peripherals, and reads and executes code in a first sector of a hard disk based on some user-configured parameters and hardware configuration information stored on a complementary metal-oxide-semiconductor (CMOS) of a mainboard to detect whether the operating system peripherals are ready for starting an operating system. The key system peripherals include a CPU, a memory, a video card, a network interface, a keyboard, a mouse, a serial port, and the like.

Step S303. Determine whether a startup sequence of disks needs to be configured.

Further, if a user does not need to configure the startup sequence of the disks, the disks are started according to a preconfigured startup sequence, that is, the disks are started according to a startup sequence recorded in a preconfigured DTS file and a DTB file.

If the user needs to configure the startup sequence of the disks, perform step S304.

Table 1 is an example of a preconfigured DTS file in the present application. The ARM device includes the preconfigured DTS file and the DTB file, or a SAS controller, hardware disk interfaces, and a correspondence between slot numbers and a startup sequence in the ARM device may be pre-specified. It is assumed that the ARM device includes two SAS controllers, and each SAS controller is connected to four disks of different slot numbers using four hardware interfaces. "Startup sequence number" is used to identify a startup sequence number corresponding to each disk. For example, in Table 1, the disks are started in ascending order of slot number.

TABLE 1

| SAS controller | Hardware interface | Slot number | Startup sequence number |
|---|---|---|---|
| SAS controller 0 | 0 | 0 | 1 |
|  | 1 | 1 | 2 |
|  | 2 | 2 | 3 |
|  | 3 | 3 | 4 |
| SAS controller 1 | 0 | 4 | 5 |
|  | 1 | 5 | 6 |
|  | 2 | 6 | 7 |
|  | 3 | 7 | 8 |

If the preconfigured DTS is shown in Table 1, content recorded in the DTS file includes the following:

SASController=<0 4>, <1 4>
PHYNo=<0 4>, <1 4>, <2 4>, <3 4>, <0 4>, <1 4>, <2 4>, <3 4>
slotNo=<0 4>, <1 4>, <2 4>, <3 4>, <4 4>, <5 4>, <6 4>, <7 4>
bootSeq=<1 4>, <2 4>, <3 4>, <4 4>, <5 4>, <6 4>, <7 4>, <8 4>

SASController is used to identify a SAS controller. SASController=<0 4>, <1 4> identifies that the ARM device includes two controllers whose SAS controller identifiers are 0 and 1, respectively. In <0 4>, a first digit indicates an identifier of a SAS controller, and a second digit indicates a quantity of bytes required for storing the description field in the memory. For example, 4 indicates that four bytes are required for storing the description field in the memory.

PHYNo=<0 4>, . . . , <3 4> sequentially indicates hardware interfaces of each SAS controller. It can be learned from Table 1 that each SAS controller corresponds to four hardware interfaces, namely hardware interfaces whose numbers are from 0 to 3. In addition, in <0 4>, a first digit indicates an identifier of a SAS controller, and a second digit indicates a quantity of bytes required for storing the description field in the memory.

slotNo=<0 4>, <1 4>, <2 4>, <3 4> sequentially indicates four disks whose slot numbers are from 0 to 3. In <0 4>, a first digit indicates a disk whose slot number is 0, and a second digit indicates a quantity of bytes required for storing the description field in the memory.

bootSeq=<1 4>, . . . , <8 4> indicates a startup sequence from 1 to 8. In <0 4>, a first digit indicates a startup sequence number, and a second digit indicates a quantity of bytes required for storing the description field in the memory.

Further, the DTS file is a user recognizable text file, and the operating system cannot directly learn of the content recorded in the file. The BIOS needs to convert the DTS text file to the binary DTB file using a DTC, and store the DTB file in a memory of the BIOS.

It should be noted that a process of compiling the DTS file to convert it to the DTB file pertains to the other approaches. Details are not described herein.

It should be further noted that, for different devices in which ARM processors of a same model are configured, a plurality of different DTS files may be preconfigured based on slot number information and a startup sequence. When the user does not need to configure a startup sequence of disks, the disks can be started according to a preconfigured startup sequence.

Step S304. If the startup sequence of the disks needs to be configured, a BIOS of the ARM device receives configuration information.

Further, the BIOS of the ARM device is responsible for providing the user with an interface for configuring a startup sequence of disks, and the user may configure, on this interface, the startup sequence of the disks and a correspondence between disks and hardware interfaces in a SAS controller.

For example, Table 2 is an example of the configuration information of the user. It is assumed that the DTS file preconfigured by the ARM device is shown in Table 1. If the configuration information input by the user is shown in Table 2, the startup sequence of the disks is adjusted. For example, a startup sequence number of a disk whose hard disk interface is 1 in the SAS controller 0 is changed to 3, a startup sequence number of a disk whose hard disk interface is 2 in the SAS controller 0 is changed to 2, a startup sequence number of a disk whose hard disk interface is 3 in the SAS controller 0 is changed to 7 . . . .

TABLE 2

| SAS controller | Hardware interface | Slot number | Startup sequence number |
|---|---|---|---|
| SAS controller 0 | 0 | 0 | 1 |
|  | 1 | 1 | 3 |
|  | 2 | 2 | 2 |
|  | 3 | 3 | 7 |
| SAS controller 1 | 0 | 4 | 4 |
|  | 1 | 5 | 6 |
|  | 2 | 6 | 5 |
|  | 3 | 7 | 8 |

Step S305. The BIOS of the ARM device updates a preconfigured DTS file according to the user's configuration, and converts the DTS file to a DTB file.

Further, the BIOS has the preconfigured DTS file shown in Table 1. When the user configures the startup sequence of the disks on the BIOS interface, the BIOS needs to update, in the preconfigured DTS file based on the configuration information of the user, a SAS controller, a hardware interface, and a correspondence between slot numbers and a startup sequence that are associated with each disk, for example, update a description field of a startup sequence number in the configuration information, for example, update the bootSeq field.

For example, if the configuration information of the user is shown in Table 2, the content recorded in the DTS file includes the following:

SASController=<0 4>, <1 4>

PhyNo=<0 4>, <1 4>, <2 4>, <3 4>, <0 4>, <1 4>, <2 4>, <3 4> slotNo=<0 4>, <1 4>, <2 4>, <3 4>, <4 4>, <5 4>, <6 4>, <7 4> bootSeq=<1 4>, <3 4>, <2 4>, <7 4>, <4 4>, <6 4>, <5 4>, <8 4>

Further, the DTS file is a user recognizable text file, and the operating system cannot directly learn of the content recorded in the file. The BIOS needs to convert the DTS text file to the binary DTB file using the DTC such that the operating system of the ARM device can recognize the DTB file.

Optionally, the BIOS may also update, in the preconfigured DTS file based on the configuration information, the SAS controller, the hardware interface, and the slot number information that are associated with each disk.

Step S306. The ARM device starts an operating system.

Further, the ARM device boots the operating system based on a kernel image file stored in the BIOS.

Step S307. The ARM device automatically loads a SAS drive.

Further, after the ARM device starts the operating system, the operating system automatically loads various drives, such as the SAS drive and a network adapter driver, where the SAS drive is responsible for recognizing the disks in the ARM device.

Step S308. The SAS drive in the ARM device reads configuration information in the DTB file, scans the disks based on the SAS controller, the hardware interface, and the correspondence between slot numbers and a startup sequence that are associated with each disk and that are in the DTB file, and starts the disks one by one.

Further, after being started, the operating system automatically constructs the data in the DTB file into a segment of data in a memory, and records initial address information of this segment of data. After being successfully loaded, the SAS drive reads the data in the DTB file in the memory, scans the disks in all SAS controllers one by one according to the user-configured startup sequence, and starts the disks. A status of a disk in the ARM device may be identified using "running" or "not running". When the SAS drive has not started the disk, the status of the disk is "not running". At this time, the disk cannot run properly, that is, cannot support read and write operations. After the SAS drive starts the disk, the status of the disk changes to "running". At this time, the disk is in the normal status, and may be reported by the SAS drive to an operating system kernel. The operating system allocates a specific drive letter to the disk, for the disk to provide read and write operations for an application program.

Step S309. The operating system of the ARM device allocates drive letters according to the sequence of the started disks reported by the SAS drive.

Further, after receiving information about the started disks that is sent by the SAS drive, the operating system of the ARM device allocates a drive letter to each disk according to the reporting sequence.

For example, in the LINUX system, the SAS drive starts a first disk according to the startup sequence, and after the disk is reported to the operating system, a drive letter sda is allocated to the disk, the SAS drive starts a second disk according to the startup sequence, and after the disk is reported to the operating system, a drive letter sdb is allocated to the disk, the SAS drive starts a third disk according to the startup sequence, and after the disk is reported to the operating system, a drive letter sdc is allocated to the disk . . . . By analogy, the SAS drive starts an $n^{th}$ disk according to the startup sequence, and after the disk is reported to the operating system, a drive letter sdn is allocated to the disk.

According to the description in the foregoing content, the ARM device can record, using the DTS file, the SAS controllers, the hardware interfaces, and the correspondence between slot numbers and a startup sequence of the disks that are configured by the user, and convert the DTS file to the binary DTB file. After the operating system is booted and loads the SAS drive, the SAS drive starts the disks one by one according to the startup sequence of the disks recorded in the DTB file, and then reports the disk information to the operating system, for the operating system to allocate the drive letters according to the reporting sequence. This resolves read and write problems caused by a failure to control a startup sequence of disks by an ARM device. In addition, in the technical solution of the present application, a startup sequence of disks is recorded in a DTS file, and therefore for different ARM devices using ARM processors of a same model, only one set of SAS drive is required to achieve an objective of controlling startup sequences of disks in the different ARM devices. This resolves a problem that different SAS drives are required to adapt to different ARM devices, and configuration is flexible and simple. Moreover, in the present application, the LINUX kernel does not need to be changed if the SAS controller is used and no RAID controller is required, achieving higher versatility.

It should be noted that, for brief description, the foregoing method embodiments are described as a series of actions. However, a person skilled in the art should understand that the present application is not limited to the described sequence of the actions.

Another appropriate step combination that a person skilled in the art can think of based on the content described above also falls within the protection scope of the present application.

Figure 4:
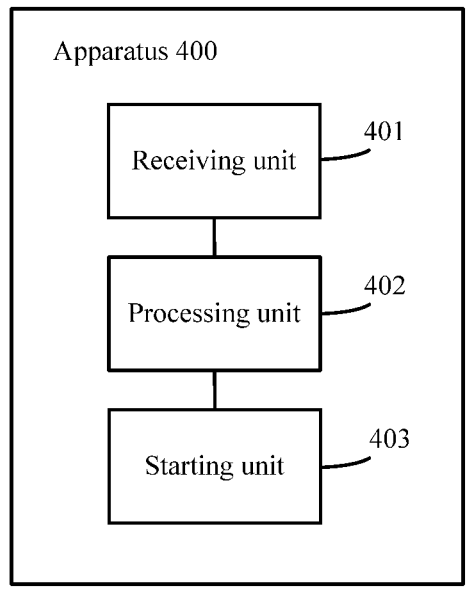
FIG. 4 is a schematic diagram of a disk management apparatus in an ARM device according to an embodiment of the present application.

The foregoing describes in detail the disk management methods in an ARM device according to the embodiments of the present application with reference to FIG. 1 to FIG. 3. The following describes a disk management apparatus in an ARM device and an ARM device according to embodiments of the present application with reference to FIG. 4 and FIG. 5. As shown in FIG. 4, the disk management apparatus 400 in the ARM device includes a receiving unit 401, a processing unit 402, and a starting unit 403.

The receiving unit 401 is configured to receive configuration information, where the configuration information includes a correspondence between slot numbers and a startup sequence of disks.

The processing unit 402 is configured to update a preconfigured DTS file based on the configuration information received by the receiving unit 401, where the DTS file before the update includes a SAS controller, a hardware interface, and a slot number that are associated with each disk, and an updated DTS file includes the SAS controller, the hardware interface, and a correspondence between slot numbers and a startup sequence that are associated with each disk, and convert the updated DTS file to a DTB file.

The starting unit 403 scans the disks based on the SAS controller, the hardware interface, and the correspondence between slot numbers and a startup sequence that are associated with each disk and that are in the DTB file obtained after conversion by the processing unit 402, and starts the disks.

It should be understood that, the apparatus 400 in this embodiment of the present application may be implemented using the CPU in FIG. 1, or may be implemented using an application-specific integrated circuit (ASIC) or a programmable logic device (PLD). The PLD may be a complex programmable logic device (CPLD), a field-programmable gate array (FPGA), a generic array logic (GAL), or any combination thereof. When the disk management method in an ARM device shown in FIG. 2 is implemented using software, the apparatus 400 and its modules may also be software modules.

Optionally, that the starting unit 403 scans the disks based on the SAS controller, the hardware interface, and the correspondence between slot numbers and a startup sequence that are associated with each disk and that are in the DTB file obtained after conversion by the processing unit 402, and starting the disks includes booting an operating system based on the DTB file such that the operating system automatically loads a SAS drive after being started, and the SAS drive scans the disks one by one based on the SAS controller, the hardware interface, and the correspondence between slot numbers and a startup sequence that are associated with each disk and that are in the DTB file, and starts the disks.

Optionally, that the receiving unit 401 receives configuration information includes starting a BIOS self-test after the ARM device performs a power-on operation, where the BIOS self-test includes detecting hardware, a network interface, a keyboard, and a serial port of the ARM device, and determining, based on a choice of a user to display a screen for configuring a startup sequence of disks.

Optionally, that the processing unit 402 converts the DTS file to a DTB file includes converting the DTS file to the DTB file using a DTC.

The apparatus 400 according to this embodiment of the present application may be corresponding to a body executing the methods in the embodiments of the present application, and the foregoing and other operations and/or functions of the units in the apparatus 400 are intended to implement the corresponding procedures in the methods shown in FIG. 2 and FIG. 3. For brevity, details are not repeated herein.

According to the foregoing description of the apparatus 400, this embodiment of the present application provides the preconfigured DTS file including SAS controllers, hardware interfaces, and the correspondence between slot numbers and a startup sequence, and the file may be updated by a BIOS according to the received configuration information, and the ARM device may start each disk based on the DTB file generated after compilation of the DTS file. This resolves problems of inflexible configuration of an ARM device caused by a manner of starting disks according to a fixed sequence and poor versatility caused by SAS drive customization, ensures consistency of drive letters of the disks before and after a restart, a power-on, or a power-off process of the ARM device, and prevents a series of read and write errors due to a drive letter change.

Figure 5:
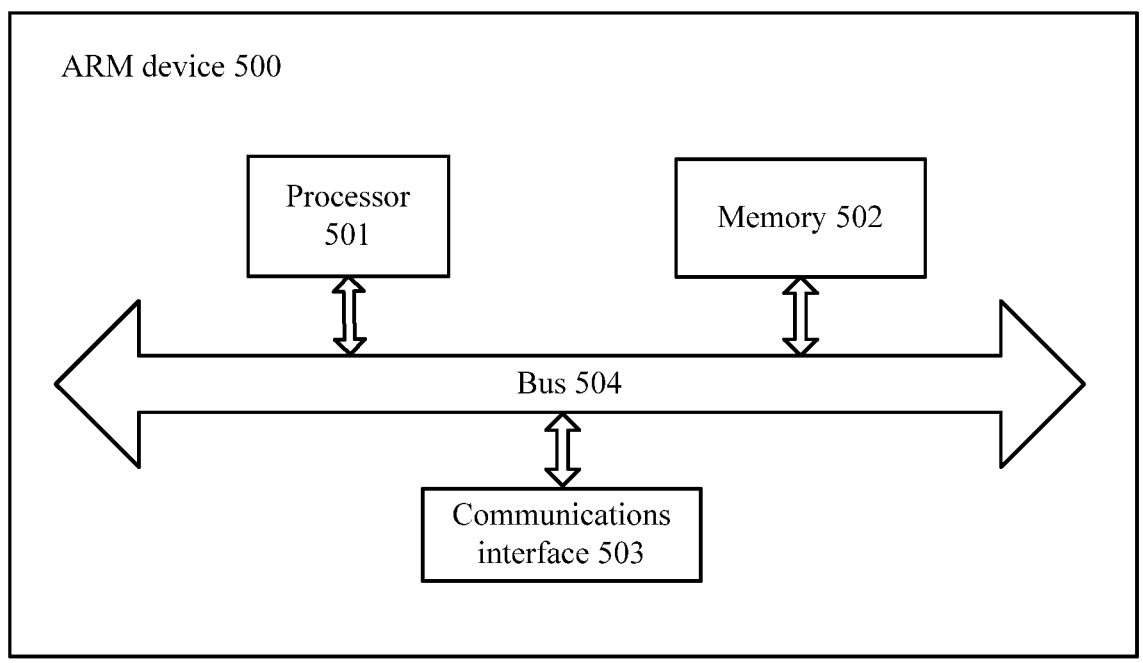
FIG. 5 is a schematic diagram of an ARM device according to an embodiment of the present application.

FIG. 5 is a schematic diagram of an ARM device 500 according to an embodiment of the present application. As shown in the figure, the ARM device 500 includes a processor 501, a memory 502, a communications interface 503, a bus 504, and a storage device (not shown). The processor 501, the memory 502, and the communications interface 503 communicate with each other using the bus 504, or may implement communication by another means such as wireless transmission. The memory 502 is configured to store an instruction, and the processor 501 is configured to execute the instruction stored by the memory 502. The memory 502 stores program code, and the processor 501 may invoke the program code stored in the memory 502 to perform the following operations of receiving configuration information, where the configuration information includes a correspondence between slot numbers and a startup sequence of disks, updating a preconfigured DTS file based on the configuration information, where the DTS file before the update includes a SAS controller, a hardware interface, and a slot number that are associated with each disk, and an updated DTS file includes the SAS controller, the hardware interface, and a correspondence between slot numbers and a startup sequence that are associated with each disk, and converting the updated DTS file to a DTB file, and scanning the disks based on the SAS controller, the hardware interface, and the correspondence between slot numbers and a startup sequence that are associated with each disk and that are in the DTB file, and starting the disks.

It should be understood that, in this embodiment of the present application, the processor 501 may be the CPU shown in FIG. 1. The memory 502 may include a read-only memory (ROM) and a random access memory (RAM), and provide an instruction and data for the processor 501. For example, the memory 502 may be the memory shown in FIG. 1. A part of the memory 502 may further include a non-volatile RAM (NVRAM), such as the disks shown in FIG. 1, or the memory 502 may further store device type information. The communications interface 503 may be the network adapter shown in FIG. 1.

The bus 504 may include not only a data bus but also a power supply bus, a control bus, a status signal bus, and the like. However, for clear description, various buses are denoted as the bus 504 in the figure.

It should be understood that the ARM device 500 according to this embodiment of the present application corresponds to the apparatus 400 provided in the embodiments of the present application. The ARM device 500 is configured to implement the corresponding procedures in the methods shown in FIG. 2 and FIG. 3. For brevity, details are not repeated herein.

In conclusion, the DTS is used to record the SAS controller, the hardware interface, and the correspondence between slot numbers and a startup sequence that are associated with each disk, and the file is allowed to be updated based on the configuration information, after the SAS drive in the ARM device is started, the disks may be started according to the configured startup sequence, and then an operating system allocates drive letters according to the startup sequence of the disks in order to resolve read and write errors of an application program in the other approaches. The errors are caused by a disk drive letter change resulting from a restart, power-on, or power-off of an ARM device. In addition, in the other approaches, when ARM chips of a same model are connected to different devices, different SAS drives need to be customized based on quantities, types, and startup sequences of disks of the ARM devices. By contrast, in the present application, only one set of SAS drive is required to implement disk management processes in the ARM devices, achieving high versatility and low costs.

A person of ordinary skill in the art may be aware that, the units and algorithm steps in the examples with reference to the embodiments disclosed in this specification can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by a person skilled in the art that, for the purpose of convenient and brief description, for a detailed working process of the foregoing system, apparatus, and unit, reference may be made to a corresponding process in the foregoing method embodiments, and details are not repeated herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not be performed. In addition, the displayed or discussed mutual couplings or direct couplings or communication connections may be implemented using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of the present application essentially, or the part contributing to the other approaches, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present application. The foregoing storage medium includes any medium that can store program code, such as a universal serial bus (USB) flash drive, a removable hard disk, a ROM, a RAM, a magnetic disk, or an optical disc.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A disk management method in an advanced reduced instruction set computing (RISC) Machine (ARM) device, comprising:
   receiving, by the ARM device, configuration information, wherein the ARM device comprises a plurality of disks, wherein each of the disks has a respective slot number, and wherein the configuration information comprises a mapping data between a startup sequence of each of the disks and the respective slot number;
   creating, by the ARM device, a device tree block (DTB) file comprising the configuration information, wherein creating the DTB file comprises:
       recording, by the ARM device, the configuration information into a preconfigured device tree source (DTS) file; and
       transferring, by the ARM device, the preconfigured DTS file into the DTB file; and
   starting, by the ARM device, each of the disks in a sequence based on the DTB file.

2. The method of claim 1, wherein the ARM device further comprises one or more serial attached Small Computer System Interface (SCSI) (SAS) controllers, wherein each of the disks is controlled by one SAS controller, wherein each SAS controller has a unique identifier, and wherein the configuration information further comprises the mapping data among SAS controller identifier, the startup sequence of each of the disks, and the respective slot number.

3. The method of claim 1, wherein starting each of the disks in the sequence comprises:
   booting, by the ARM device, an operating system based on the DTB file, wherein the operating system is configured to load a serial attached Small Computer System Interface (SCSI) (SAS) drive after the disks being started, and wherein the SAS drive scans the disks based on the mapping data; and
   starting, by the ARM device, the disks respectively in the sequence.

4. The method of claim 1, further comprising:
   determining, by the ARM device after performing a power-on operation, a state of hardware of the ARM device; and
   configuring, by the ARM device, startup sequence of the disks based on the determination of the state of hardware of the ARM device.

5. The method of claim 1, wherein transferring the preconfigured DTS file into the DTB file comprises transferring, by the ARM device, the preconfigured DTS file into the DTB file using a device tree compiler (DTC).

6. The method of claim 1, wherein the DTS file is a user recognizable text file.

7. An advanced reduced instruction set computing (RISC) Machine (ARM) device, comprising:
   a plurality of disks, wherein each of the disks has a respective slot number;
   a memory configured to store a computer executable instruction; and
   a processor coupled to the memory and the disks, wherein the computer executable instruction in the memory causes the processor to be configured to:
       receive configuration information comprising a mapping data between a startup sequence of each of the disks and the respective slot number;

create a device tree block (DTB) file comprising the configuration information, wherein the computer executable instruction further causes the processor to be configured to:
  record the configuration information into a preconfigured device tree source (DTS) file; and
  transfer the preconfigured DTS file into the DTB file; and
start each of the disks in a sequence based on the DTB file.

8. The ARM device of claim 7, further comprising one or more serial attached Small Computer System Interface (SCSI) (SAS) controllers, wherein each of the disks is controlled by one SAS controller, wherein each SAS controller has a unique identifier, and wherein the configuration information further comprises the mapping data among SAS controller identifier, the startup sequence of each of the disks, and the respective slot number.

9. The ARM device of claim 7, wherein the computer executable instruction further causes the processor to be configured to:
  boot an operating system based on the DTB file, wherein the operating system is configured to load a serial attached Small Computer System Interface (SCSI) (SAS) drive after the disks being started, and wherein the SAS drive scans the disks based on the mapping data; and
  start the disks respectively in the sequence.

10. The ARM device of claim 7, wherein the computer executable instruction further causes the processor to be configured to:
  determine, after performing a power-on operation, a state of hardware of the ARM device; and
  configure startup sequence of the disks based on the determination of the state of hardware of the ARM device.

11. The ARM device of claim 7, wherein the computer executable instruction further causes the processor to be configured to convert the preconfigured DTS file to the DTB file using a device tree compiler (DTC).

12. The ARM device of claim 7, wherein the DTS file is a user recognizable text file.

13. A non-transitory computer-readable storage medium comprising instructions which, when executed by an advanced reduced instruction set computing (RISC) Machine (ARM) device, cause the ARM device to:
  receive configuration information, wherein the ARM device comprises a plurality of disks, wherein each of the disks has a respective slot number, and wherein the configuration information comprises a mapping data between a startup sequence of each of the disks and the respective slot number;
  create a device tree block (DTB) file comprising the configuration information, wherein the instructions further cause the ARM device to be configured to:
    record the configuration information into a preconfigured device tree source (DTS) file; and
    transfer the preconfigured DTS file into the DTB file; and
  start each of the disks in a sequence based on the DTB file.

14. The non-transitory computer-readable storage medium of claim 13, wherein the ARM device further comprises one or more serial attached Small Computer System Interface (SCSI) (SAS) controllers, wherein each of the disk is controlled by one SAS controller, wherein each SAS controller has a unique identifier, and wherein the configuration information further comprises the mapping data among SAS controller identifier, the startup sequence of each of the disks, and the respective slot number.

15. The non-transitory computer-readable storage medium of claim 13, wherein the instructions further cause the ARM device to be configured to:
  boot an operating system based on the DTB file, wherein the operating system is configured to load a serial attached Small Computer System Interface (SCSI) (SAS) drive after the disks being started, and wherein the SAS drive scans the disks based on the mapping data; and
  start the disks respectively in the sequence.

16. The non-transitory computer-readable storage medium of claim 13, wherein the instructions further cause the ARM device to be configured to:
  determine, after performing a power-on operation, a state of hardware of the ARM device; and
  configure startup sequence of the disks based on the determination of the state of hardware of the ARM device.

17. The non-transitory computer-readable storage medium of claim 13, wherein the instructions further cause the ARM device to be configured to convert the preconfigured DTS file to the DTB file using a device tree compiler (DTC).

18. The non-transitory computer-readable storage medium of claim 13, wherein the instructions further cause the ARM device to operate a LINUX operating system.

19. The non-transitory computer-readable storage medium of claim 13, wherein the instructions further cause the ARM device to operate a WINDOWS operating system.

20. The non-transitory computer-readable storage medium of claim 13, wherein the DTS file is a user recognizable text file.

* * * * *